United States Patent
Bhandarkar et al.

(10) Patent No.: US 6,457,329 B1
(45) Date of Patent: Oct. 1, 2002

(54) PROCESS FOR FABRICATING SOL-GEL ARTICLE INVOLVING LOW-SHRINKAGE FORMULATION

(75) Inventors: Suhas Bhandarkar, Glen Gardner; Debra Anne Fleming, Berkeley Heights; David Wilfred Johnson, Jr., Bedminster, all of NJ (US)

(73) Assignee: Fitel USA Corp.

( * ) Notice: Subject to any disclaimer, the term of this patent is extended or adjusted under 35 U.S.C. 154(b) by 0 days.

(21) Appl. No.: 09/737,069

(22) Filed: Dec. 14, 2000

(51) Int. Cl.$^7$ ................................................ C03B 8/00
(52) U.S. Cl. ........................ 65/17.2; 65/395; 65/396; 501/12; 423/338
(58) Field of Search .................... 65/17.2, 395, 396; 423/338; 501/12

(56) References Cited

U.S. PATENT DOCUMENTS

| | | |
|---|---|---|
| 4,217,027 A | 8/1980 | MacChesney et al. |
| 4,262,035 A | 4/1981 | Jaeger et al. |
| 4,775,401 A | 10/1988 | Fleming et al. |
| 4,909,816 A | 3/1990 | MacChesney et al. |
| 5,240,488 A | 8/1993 | Chandross et al. |
| 5,356,447 A | 10/1994 | Bhandarkar |
| 5,944,866 A | * 8/1999 | Chen et al. |

OTHER PUBLICATIONS

C. J. Brinker et al., *Sol–Gel Science*, Academic Press, Ch. 8, pp. 453–509.
H. D. Bijsterbosch et al., "Nonselective Adsorption of Block Copolymers and the Effect of Block Incompatibility," *Macromolecules*, vol. 31, 7436–44 (1998).
J. Rubio et al., The Mechanism of Adsorption of Poly(Ethylene Oxide) Flocculant on Silica, *Journal of Colloid and Interface Science*, vol. 57, No. 1, 132 (1976).
C.M. Lindquist et al., "The Role of Polyelectrolyte Charge Density and Molecular Weight on the Adsorption and Flocculation of Colloidal Silica with Polyethylenimine", *Journal of Colloid and Interface Science*, vol. 55, No. 1 pp. 45–59 (1976).

* cited by examiner

Primary Examiner—Michael Colaianni
(74) Attorney, Agent, or Firm—Scott Rittman

(57) ABSTRACT

A silica sol-gel fabrication process is provided which allows improved control of the shrinkage that takes place during the drying of a gel body. In particular, the invention makes it possible to attain extremely low shrinkage through the completion of the drying stage, e.g., below 1% linear shrinkage, in relatively large sol-gel bodies of (dry weight) 1 kg or more, typically 10 kg or more, or even 40 kg or more, compared to the much higher shrinkages typically encountered. Specifically, use of a particular polymeric additive makes it possible for a gel body to experience linear shrinkage at least 55% less than an identical process without the polymeric additive.

13 Claims, 1 Drawing Sheet

PROCESS FOR FABRICATING SOL-GEL ARTICLE INVOLVING LOW-SHRINKAGE FORMULATION

BACKGROUND OF THE INVENTION

1. Field of the Invention

The invention relates to fabrication of silica bodies by colloidal sol-gel techniques.

2. Discussion of the Related Art

Optical transmission fiber typically contains a high-purity silica glass core optionally doped with a refractive index-raising element such as germanium, an inner cladding of high-purity silica glass optionally doped with a refractive index-lowering element such as fluorine, and an outer cladding of undoped silica glass. In some manufacturing processes, the preforms for making such fiber are fabricated by forming an overcladding tube for the outer cladding, and separately forming a rod containing the core material and inner cladding material. The core/inner cladding are fabricated by any of a variety of vapor deposition methods known to those skilled in the art, including vapor axial deposition (VAD), outside vapor deposition (OVD), and modified chemical vapor deposition (MCVD). MCVD is discussed in co-assigned U.S. Pat. Nos. 4,217,027; 4,262,035; and 4,909,816. MCVD involves passing a high-purity gas, e.g., a mixture of gases containing silicon and germanium, through the interior of a silica tube (known as the substrate tube) while heating the outside of the tube with a traversing oxy-hydrogen torch. In the heated area of the tube, a gas phase reaction occurs that deposits particles on the tube wall. This deposit, which forms ahead of the torch, is sintered as the torch passes over it. The process is repeated in successive passes until the requisite quantity of silica and/or germanium-doped silica is deposited. Once deposition is complete, the body is heated to collapse the substrate tube and obtain a consolidated core rod in which the substrate tube constitutes the outer portion of the inner cladding material. To obtain a finished preform, the overcladding tube is typically placed over the core rod, and the components are heated and collapsed into a solid, consolidated preform. It is possible to sinter a porous overcladding tube while collapsing it onto a core rod, as described in co-assigned U.S. Pat. No. 4,775,401.

Because the outer cladding of a fiber is distant from transmitted light, the overcladding glass generally does not have to meet the optical performance specifications to which the core and the inner cladding must conform. For this reason, efforts to both ease and speed manufacture of fiber preforms have focused on methods of making overcladding tubes. One area of such efforts is the use of a sol-gel casting process. Co-assigned U.S. Pat. No. 5,240,488 discloses a sol-gel process capable of producing crack-free overcladding preform tubes of a kilogram or larger. In this process, a colloidal silica dispersion, e.g., fumed silica, is obtained having a pH of 2 to 4. To obtain adequate stability of the dispersion and prevent agglomeration, the pH is raised to a value of about 10 to about 14 by use of a base. Typically, a commercially-obtained dispersion is pre-stabilized at such a pH value by addition of a base such as tetramethylammonium hydroxide (TMAH). Introduction of the TMAH raises the pH value. Other quaternary ammonium hydroxides behave similarly. When the pH is so raised, the silica takes on a negative surface charge due to ionization of silanol groups present on the surface, in accordance with the following reaction:

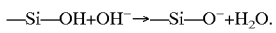

The negative charge of the silica particles creates mutual repulsion, preventing substantial agglomeration and maintaining the stability of the dispersion. In this state, the surface charge, and nominally the zeta potential, of the particles is at a negative value. (Zeta potential is the potential across the diffuse layer of ions surrounding a charged colloidal particle, and is typically measured from electrophoretic mobilities—the rate at which colloidal particles travel between charged electrodes placed in a solution. See, e.g., C. J. Brinker and G. W. Scherer, *Sol-Gel Science*, Academic Press, 242–243.)

At a later stage in the process, as discussed in Col. 15, lines 39–65 of the '488 patent, a gelling agent such as methyl formate is added to reduce the pH. It is possible to use other esters, as well. The ester reacts to neutralize base, and the negative character of the silica particles is neutralized according to the following reaction:

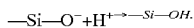

A sufficient amount of the ester must be introduced to neutralize the silica to a degree where gelation is induced. (Gelation, as used herein, indicates that the colloidal silica particles have formed a three-dimensional network with some interstitial liquid, such that the dispersion becomes essentially non-flowing, e.g., exhibiting solid-like behavior, at room temperature.) Subsequent to gelation, the sol-gel body is typically released from its mold, dried, heat treated, and sintered, as reflected in the Table at Cols. 11–12 of the '488 patent.

As discussed in the '488 patent, a major problem that had been encountered in sol-gel fabrication of relatively large bodies, e.g., 1 kg or greater, was cracking of the bodies during drying, heat treatment and/or sintering. In particular, the gel body undergoes substantial shrinkage from its gel form to its sintered form, e.g., typically greater than 10 linear percent shrinkage. This shrinkage induces numerous stresses in the body, and these stresses often lead to cracks. According to the '488 patent, however, the inclusion in the sol of an extremely small amount of polymer additive, referred to as binder, reduced such cracking, particularly when a plasticizer was also used. (See, e.g., Col. 5, lines 19–56.) For this reason, the formulation of the '488 patent allowed fabrication of tubes of useful size in a commercially feasible manner.

However, the gel bodies produced by such sol-gel processes still undergo relatively substantial shrinkage from gel form to sintered form. This shrinkage continues to exert stresses throughout the body, and the gel bodies therefore require careful and highly controlled drying processes. These careful, controlled treatments are time-consuming and relatively costly. And the shrinkage reduces the number of uses for such sol-gel bodies. Processes which reduce the shrinkage and/or otherwise allow use of less time-consuming and costly techniques would be highly advantageous.

SUMMARY OF THE INVENTION

The invention provides a silica sol-gel fabrication process of the type described in the '488 patent, but which allows improved control of the shrinkage that takes place during the drying of a gel body. Specifically, use of a particular polymeric additive makes it possible for a gel body to experience linear shrinkage, through the drying stage, at least 55% less than an identical process without the polymeric additive (meaning 100×(percent shrinkage without additive−percent shrinkage with additive)/percent shrinkage without additive). For example, it is possible to attain extremely low shrinkage—even below 1% linear shrinkage, in relatively large sol-gel bodies of (dry weight) 1 kg or more, typically 10 kg or more, and even 40 kg or more, by adding a sufficient amount and type of additive. (Percent linear shrinkage indicates 100×(initial length−final length)/initial length. The drying stage is complete when the body contains about 3 wt.% water or less.)

The shrinkage mechanism in silica sol-gel bodies has been modeled using classical drying theory, and this modeled mechanism is widely accepted. (See, e.g., C. J. Brinker and G. W. Scherer, supra, 453–509. ) Specifically, as drying occurs on the outer surface of a gel body, the solid material at the drying front is exposed to the ambient atmosphere. Because silica typically has surface silanols and thereby is hydrophilic, solid-vapor interfacial energy is greater than solid-liquid interfacial energy, i.e., the solid prefers to be wetted by the liquid rather than the vapor. To make this happen, liquid from the interior of the body flows toward the exterior to replace liquid that is evaporating from the outer surface. The flow of this liquid through a tortuous, fine pore matrix induces a pressure gradient, thereby putting the liquid in tension, and the resultant compressive force on the gel body causes shrinkage, as well as the tendency for cracking—a major obstacle in sol-gel manufacture. Thus, it is this hydrophilic property of silica that leads to shrinkage and cracking.

The process of the invention controls this shrinkage mechanism by providing in situ hydrophobicity to the silica during gelation. The additive generally contains a hydrocarbon chain having an attached hydrogen-acceptor moiety (e.g., an ether or carboxylic acid group), and is believed to function as follows. At the relatively high pH (>10) at which the colloidal silica sol is initially stabilized, a relatively low number of silanol groups are present on the surface of the silica particles due to de-protonation. Thus, adsorption of the polymer additive onto the silanols is also relatively low. However, as the gelling agent lowers the pH, surface silanol groups are re-formed, and thus an increasing amount of the additive adsorbs onto the silica particles. See, e.g., H. D. Bijsterbosch et al., "Nonselective Adsorption of Block Copolymers and the Effect of Block Incompatibility," *Macromolecules*, Vol. 31, 7436–44 (1998). This adsorption expectedly renders the silica surface increasingly hydrophobic (i.e., in situ hydrophobicity), because the oxygen-containing groups of the additive are oriented toward and hydrogen-bonded to the silanols, such that the exposed hydrocarbon chains form a hydrophobic coating. By making the silica hydrophobic, the propensity of the liquid to wet the silica of the gel body is substantially diminished, i.e., the liquid puts much less tension on the drying gel body. And the result is less shrinkage and substantially less cracking.

Surprisingly, one such polymeric additive is optionally the so-called binder referred to in the '488 patent, but in higher concentrations than called for in the patent. It was unexpectedly discovered that providing an increased concentration of such binder, relative to the amounts called for in the '488 patent, provided a significant decrease in shrinkage of gel bodies. For example, Col. 8, lines 37–55 of the '488 patent instruct one to use, for a 40 to 50 wt. % silica dispersion, at most, 1 wt. % polymer based on the weight of the silica, but suggest that 0.5 wt. % or less is preferred. Higher amounts are indicated to lead to void formation and associated degradation of optical quality. Yet, it was discovered that higher amounts, for such silica loadings, are actually advantageous—in contrast to the teachings of the '488 patent. The process of the present invention generally uses, for such loadings, greater than 1 wt. % of additive, more typically at least 3 wt. %, based on the weight of the silica, with the precise amount depending on, among other things, the particular additive, as discussed below.

By substantially lowering shrinkage, the invention makes it possible to increase the speed of drying, heat treatment, and sintering for sol-gel bodies. Moreover, the invention makes it possible to form more intricate and delicate bodies that are not feasible with current sol-gel techniques.

DETAILED DESCRIPTION OF THE INVENTION

Figure 1:
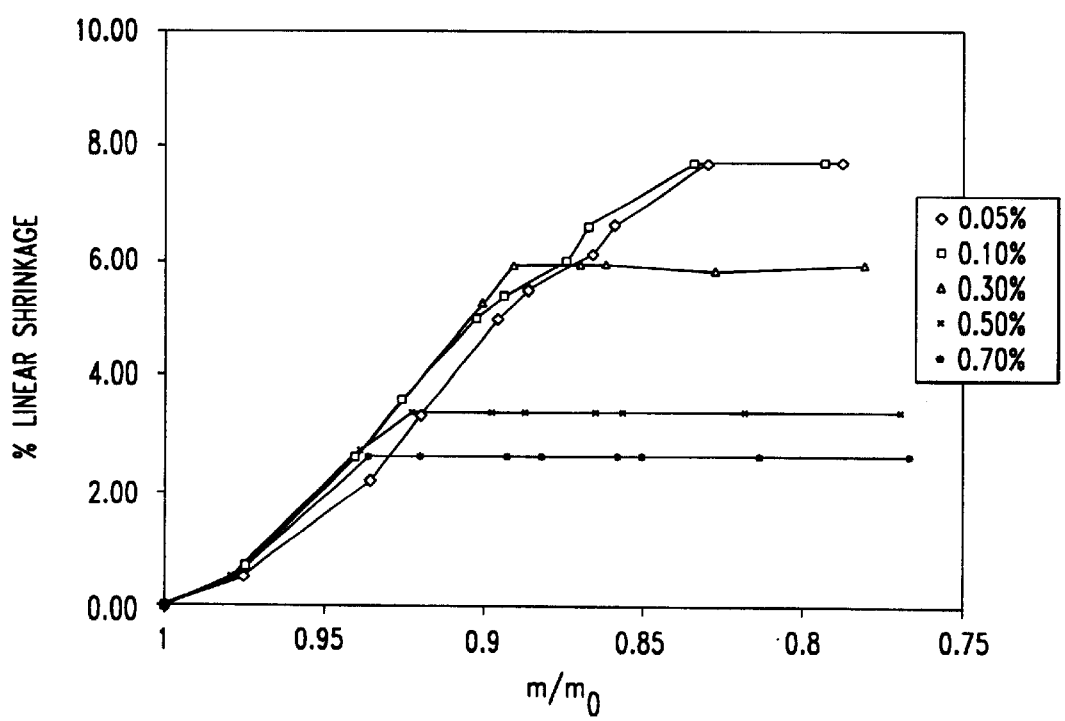
FIG. 1 shows the effect on shrinkage of varying amounts of the polymeric additive of the invention.

According to one embodiment of the invention, an aqueous stabilized silica dispersion, or sol, is provided or produced. The dispersion typically contains about 40 to about 75 wt. % silica, more typically about 50 to about 65 wt. % silica, based on the weight of the sol. The surface area of the silica generally ranges from (nominally) 5 to 100 $m^2/g$, more typically 10 to 50 $m^2/g$. Shrinkage that occurs during drying is controlled largely by the starting concentration of silica particles of a given size range. For example, following a technique such as disclosed in the '488 patent, but with no binder or plasticizer added, a gel body formed from fumed silica particles of nominal surface area of 50 $m^2/g$ will shrink about 13 linear percent using a sol with 43 wt. % silica, but only about 10 linear percent with a sol containing 52 wt. % silica. (The feasible upper limit for silica of this size is about 65 wt. %—at higher loadings the rheology of the sol is generally too restrictive to all processing.) The lowest attainable drying shrinkage for nominal 50 $m^2/g$ silica, without added polymer and with an acceptable rheology for processing, is about 5 %, using a 65 wt. % silica sol. More concentrated sols are possible with larger silica particles, and would be expected to further decrease shrinkage.

The silica dispersion is stabilized by conventional methods, typically at a pH greater than 10, more typically greater than 11. Stabilization is generally provided by adding TMAH, typically up to about 3 wt. %, although other organic bases are also possible, including other tetraalkylammonium hydroxides where the alkyl is ethyl, propyl, or butyl. The dispersion is typically aged for at least 18 hours, more typically at least 24 hours, to adequately dissolve the silica, and then optionally centrifuged to remove contaminants.

Optionally, the isoelectric point (IEP) of the silica is adjusted to about 9.0 (advantageously 10.0) or greater by addition of an IEP-modifying compound, such that the gel point is about 10.5 or greater. (The isoelectric point is the point on the pH scale where the zeta potential is zero, as discussed in C. J. Brinker and G. W. Scherer, *Sol-Gel Science*, supra. The gel point is typically about 1 to 2 pH units higher than the isoelectric point. Specifically, as the pH approaches the IEP, the zeta potential, and thus the mutual repulsion, of the particles diminishes to the point where ordinary thermal energy, i.e., Brownian motion, is able to break through the repulsive barrier such that gelation begins.) The IEP-modifying compound is typically selected from ammonium hydroxide, primary amines, secondary amines, tertiary amines, or compounds containing a combination of primary, secondary, and/or tertiary amines (examples of the latter combination including N,N'-bis(2-aminoethyl) piperazine and N,N'-bis-(3-aminopropyl)

piperazine). Examples of useful compounds within this group include diethylenetriamine, hexamethylenediamine, and tris(2-aminoethyl)amine. The amount of IEP-modifying compound added depends on the compound's particular effect. A small amount of some compounds has an effect equivalent to several times more of another compound. In addition, the properties of the gel depend largely on the particular IEP-modifying compound used. Selection of the IEP-modifying compound also depends on whether one desires to cast or extrude the resultant gel. Use of such compounds to adjust IEP is discussed in co-assigned U.S. Pat. No. 5,944,866, and co-assigned U.S. patent application Ser. No. 09/280588, filed Mar. 29, 1999, the disclosures of which are hereby incorporated by reference. The dispersion is stabilized, and IEP adjusted, such that the pH of the dispersion is greater than the gel point.

The polymeric additive of the invention is then added (before, with, or just after the gelling agent). As noted above, the polymeric additive provides in situ hydrophobicity to the silica. The additive is believed to function by the following mechanism. At the relatively high pH (>10) at which the colloidal silica sol is initially stabilized, a relatively low number of silanol groups are present on the surface of the silica particles. Thus, adsorption of the polymer additive onto the silanols is also relatively low, and silica remains in its charged and hydrophilic state. However, as the gelling agent lowers the pH, more surface silanol groups are found, and thus an increasing amount of the additive adsorbs onto the silica particles. This adsorption renders the silica surface increasingly hydrophobic (i.e., in situ hydrophobicity), because the oxygen-containing groups of the additive are oriented toward and hydrogen-bonded to the silanes, such that the exposed hydrocarbon chains form a hydrophobic coating. By making the silica hydrophobic, the propensity of the liquid to wet the silica of the gel body is substantially diminished, i.e., the liquid puts much less tension on the drying gel body. And the result is less shrinkage and less cracking. (There is a continuum from hydrophilic to hydrophobic, but silica is considered to be hydrophilic when there are at least 2.7 surface silanol groups per square nanometer, and hydrophobic when at least 30% of these groups are removed or no longer exposed)

The inclusion of the additive generally changes the rheology of the sol, however. Specifically, when the polymer additive is introduced in to the sol at a relatively high pH of about 11.5, the silica particles have weak interactions driven by the well-known depletion flocculation mechanism. This results in increased viscosity of the sol. Thus, this increase must be factored in when designing a specific process. The additive generally contains a hydrocarbon chain having an attached hydrogen-acceptor moiety (e.g., an ether or carboxylic acid group). Examples include hydroxy propyl cellulose, poly(2-ethyl-2-oxazoline)-co-(2-phenyl-2-oxazoline), poly(2-ethyl-2-oxazoline), poly(ethylene oxide), poly(ethylene glycol), poly(vinylpyrrolidone), and poly (vinyl alcohol). The first three of these listed compounds are particularly advantageous, as reflected in the Examples. In general, the greater the hydrophobicity of the exposed chains, the greater the effect of the polymer on lowering shrinkage. As reflected in Example 8, larger molecular weight polymers also tend to have an increased effect on reducing shrinkage, since they adsorb more strongly to the silica surface. The surface bonding is surmised to be dominated by the presence of isolated silanols separated by siloxane regions, as is the case with fumed silica particle surfaces. (See, e.g., J. Rubio and J. A. Kitchener, "The Mechanism of Adsorption of Poly(Ethylene Oxide) Flocculant on Silica, *Journal of Colloid and Interface Science*, Vol. 57, No. 1, 132 (1976).) However, such large polymers tend to be difficult to dissolve in water, and thus molecular weights in the range of 20K to 100K appear to be the most useful and feasible.

As noted above, the polymer additive affects the drying mechanism, such that at the completion of drying, the gel body has undergone linear shrinkage at least 55% less than an identical process without the polymeric additive. Optionally, the linear shrinkage is at least 90% less than such an identical process. The amount of polymer will vary depending on, among other things, the weight percent silica in the sol. For example, for a 55 wt. % silica sol, a concentration of greater than 1 wt. % additive will generally be useful. For higher loadings, e.g., greater than 60 wt. % silica, less polymer is needed, e.g., 0.5 wt. % additive is typically useful. Also, as reflected in the Examples, the properties of the polymer additive determine its effect on reducing shrinkage, and thus the precise amount of additive needed will also depend on the particular additive and the amount of shrinkage that is allowable.

A gelling agent is added to reduce the pH of the dispersion to the gel point. Generally, up to about 5 wt. % (based on the weight of the dispersion) of gelling agent is suitable, with the requisite amount selected depending on the concentration of base used for stabilizing the dispersion. The gelling agent is typically a water-soluble liquid that undergoes hydrolysis to consume base, e.g., an ester, amide, or an alkyl halide, and thereby lowers the pH. After adding the gelling agent, the dispersion is typically transferred into a mold or an extruder, where it is allowed to gel. Gelling typically occurs over a time period of about 15 minutes to about 20 hours. Where the gel body is molded, the gel is then typically allowed to age in the mold for up to 30 hours. For extrusion, the gel generally ages for a few hours or less. Aging provides a desirable rearrangement of particles, leading to better packing, expulsion of some liquid around the particles, and associated shrinkage of the gel in the mold—a process known as syneresis. Syneresis adds strength and, due to the shrinkage, eases removal from a mold. Once aged, the gel is released from the mold, or extruded into the desired shape. The gel is then dried, typically starting under relatively moderate conditions, e.g., temperature less than 25° C. and relative humidity greater than 50%. A significant advantage of the invention is the ability to dry the body more rapidly, due to the lower shrinkage. As noted above, the drying stage is considered to be complete when about 3 wt. % water remains in the body.

Heat treatment of the body is then performed. (As used herein, heat treatment includes any number or combination of steps that provide removal of water, hydroxyl ions, organic materials, metal contaminants, undesired refractory metal oxide particulates, and/or other undesired elements.) Typically, the body is heated to temperatures of 25 to 400° C. to complete water removal and remove organics in an inert atmosphere. Air is generally introduced to oxidize remaining organics. Metal contaminants, hydroxyl ions, and refractory metal oxide particulates are generally removed by exposure to a chlorine-containing atmosphere at temperatures of 400 to 1000° C. An additional air treatment is generally performed to remove chlorine from the body, and the body is then cooled in nitrogen, and kept in a dry atmosphere until sintering is performed. Alternative treatments that provide sufficient removal of undesired materials are also possible. See, e.g., co-assigned U.S. Pat. No. 5,356,447 and co-assigned U.S. patent application Ser. No. 09/109,827.

The process is useful for a variety of applications, including fabrication of overcladding tubes for optical fiber preforms, as discussed, for example, in U.S. Pat. No. 5,240,488, referenced previously, as well as substrate tubes. Because of the extremely low shrinkage attained by the process of the invention, however, the sol-gel technique has a broader application than previous sol-gel techniques. For example, it is possible to form a sol-gel film on a rigid substrate, since with low shrinkage, lower stresses are induced during drying. Complex and precision parts are also contemplated due to the lessened shrinkage. Also contemplated are bodies comprising multiple compositions, e.g., preforms for graded index fiber, by reducing differential shrinkage. In particular, it is typically not possible to form such composite fibers, since the different shrinkage rates of different compositions in a preform tend to cause fracture during drying.

The invention will be further clarified by the following examples, which are intended to be exemplary.

COMPARATIVE EXAMPLE 1

A sol containing about 43 wt. % commercial fumed silica particles with a nominal specific surface area of 50 $m^2/gm$ was made using 1.5 wt. % tetramethylammonium hydroxide (TMAH) as a stabilizer. The sol was mixed with 0.6 wt. % tris(2-aminoethyl) amine (STAR) as the IEP modifier and 2.4 wt % of methyl acetate as the gelling agent.

The sol was poured into a tubular mold about 30 cm long and 10 cm in diameter. The resultant gel was aged for about 15 hours and then extracted from the mold. It was dried at 65% relative humidity (RH) and 22° C. for about a week. Isotropic shrinkage was observed until the critical point, where shrinkage stopped. The net shrinkage was about 13 linear %. When the starting sol was replaced by more concentrated sols containing 55% and 61% silica, the shrinkage dropped to about 10 % and 6% respectively.

Additional experiments, using the same technique, were performed with different mold sizes, different drying rates, and/or with STAR absent. The shrinkage was shown to 5 be substantially independent of these parameters.

COMPARATIVE EXAMPLE 2

A series of experiments were carried out to examine the effect of surfactants, which might conventionally be expected lower the surface tension of water in the sol and hence the capillary forces. For gels made according to Comparative Example 1, using a 55 wt. % silica sol, 0.05–0.1 wt. % of several non-ionic surfactants were added just prior to adding the gelling agent. The surfactants were TritonX-100, a hydrocarbon surfactant, FC170C (available from 3M Company) and Zonyl FSN (available from Dupont Company), the latter two being fluorinated surfactants. Addition of these surfactants did not change the shrinkage behavior, relative to an identical process with no additive.

COMPARATIVE EXAMPLE 3

Following the procedure of Comparative Example 1, for a 55 wt. % silica sol, several experiments were performed in which up to 1 wt. % of trimethylbutoxy silane (dissolved in methyl acetate) was added prior to adding the gelling agent. It was contemplated that introduction of alkyl-alkoxy silanes would make the silica hydrophobic due to the attachment of the silane to the silica particles. Addition of the silane induced no change in shrinkage relative to an identical process with no additive. It is believed that the silane hydrolyzed and di-merized, rather than attaching to the silica surface.

EXAMPLE 4

The procedure of Comparative Example 1 was followed, with a 55 wt. % silica sol. Varying amounts of poly(2-ethyl-2-oxazoline) (MW 50,000) were added prior to gelation. This polymer had a significant impact on shrinkage as shown in FIG. 1. This Figure shows the shrinkage as a function of the degree of drying for different concentrations of poly(2-ethyl-2-oxazoline), with the weight % of the polymer based on the initial weight of the 55% silica sol. The abscissa axis represents the mass of the gel as a fraction of the initial mass of the gel as water evaporates. Water recedes in to the pores at the critical point, which is also the end point of shrinkage. As seen in the plot, with lowered shrinkage, the critical point occurs earlier in the drying stage.

At relatively small concentrations of the polymer, such as below 0.3 wt. %, there was little change in the viscosity of the sol. As the concentration increased, however, the viscosity increased immediately after the addition of the polymer, due to flocculation.

EXAMPLE 5

The procedure of Example 4 was followed, with the additive being poly(2-ethyl-2-oxazoline) -co- (2-phenyl-2-oxazoline) (MW 50,000). Adding 0.5 wt. % of this additive decreased the shrinkage to 1.8 linear %.

COMPARATIVE EXAMPLE 6

The procedure of Example 5 was followed, with the additive being polyethylenimine (MW 18,000). There was no change in the viscosity of the sol (no flocculation) or shrinkage of the gel compared to an identical process with no additive, even with 2 wt. % of the polymer added in. Given that the poly(ethyloxazoline) of Example 4 is considered to be a N-propionyl substituted linear polyethylimine, this difference in the behavior highlights the importance of the side chain in providing the necessary hydrophobicity.

EXAMPLE 7

The procedure of Example 4 was followed, with the additive being hydroxy propyl cellulose (MW 80,000), which was highly effective in lowering shrinkage. At an additive concentration of 1.0 wt. %, the shrinkage was only 0.5 linear %. As with the poly(ethyloxazoline), addition of this molecule also increased the viscosity of the sol.

EXAMPLE 8

Following the procedure of Example 4, 0.5 wt. %, based on the weight of the entire sol, of various additives were added to the sol. The effect on shrinkage is shown in the Table below.

TABLE

| Polymer Additive | Linear Shrinkage |
| --- | --- |
| None | 9.7% |
| Hydroxy propyl cellulose (MW 80 K) | 1.2 |
| Poly(2-ethyl-2-oxazoline)-co-(2-phenyl-2-oxazoline) (MW 50 K) | 1.8 |
| Poly(ethylene oxide) (MW 100 K) | 2.5 |
| Poly(2-ethyl-2-oxazoline) (MW 50 K) | 3.0 |
| Poly(2-ethyl-2-oxazoline) (MW 5 K) | 7.0 |
| Poly(ethylene glycol) (MW 10 K) | 7.0 |

TABLE-continued

| Polymer Additive | Linear Shrinkage |
|---|---|
| Poly(vinylpyrrolidone) (MW 55 K) | 7.3 |
| Poly(vinyl alcohol) (MW 13–23 K) | 7.5 |
| Polyethylenimine (MW 18 K) | 9.6 |
| Polyethylenimine (ethoxylated) (MW 80 K) | 9.6 | other embodiments of the invention will be apparent to those skilled in the art from consideration of the specification and practice of the invention disclosed herein.

What is claimed is:

1. A process for forming an article, comprising the steps of:
    providing an aqueous silica dispersion comprising 40 to 75 wt. % silica particles, wherein the silica particles have a nominal surface area of 5 to 100 $m^2/g$, and wherein the dispersion is stabilized at a pH of at least 10;
    adding to the dispersion a polymeric additive in an amount greater tan 1 wt. % of the silica particles;
    adding to the dispersion a gelling agent to induce gelation; and
    drying the resultant gel body.

2. The process of claim 1, wherein the polymer additive is added in an amount of at least 3 wt. % of the silica.

3. The process of claim 1, wherein the silica particles have a nominal surface area of 10 to 50 $m^2mg$.

4. The process of claim 1, wherein the dispersion comprises 50 to 65 wt. % silica particles.

5. The process of claim 1, wherein the dispersion is stabilized at a pH of at least 11.

6. The process of claim 1, wherein the polymeric additive comprises a hydrocarbon chain comprising an attached hydrogen-acceptor.

7. The process of claim 6, wherein the polymeric additive comprises hydroxy propyl cellulose, poly(2-ethyl-2-oxazoline)co-(2-phenyl-2oxazoline), poly(2-ethyl-2-oxazoline), poly(ethylene oxide), poly(ethylene glycol), poly(vinylpyrrolidone), or poly(vinyl alcohol).

8. The process of claim 7, wherein the polymeric additive is at least one compound selected from the group consisting of hydroxy propyl cellulose, poly(2-ethyl-2oxazoline)co-(2-phenyl-2oxazoline), and poly(2ethyl-2-oxazoline).

9. The process of claim 1, further comprising a step of adding a compound that increases the isoelectric point of the dispersion.

10. The process of claim 1, wherein the dispersion further comprises a stabilizing agent comprising a tetraalkylammonium hydroxide, where the alkyl is methyl, ethyl, propyl, or butyl.

11. The process of claim 1, further comprising the steps of:
    heat treating the dried gel body; and
    sintering the heat treated body.

12. The process of claim 1, wherein prior to gelation, the surfaces of the silica particles are primarily hydrophilic, and during gelation, the surfaces of the silica particles become primarily hydrophobic.

13. The process of claim 1, wherein the polymeric additive comprises hydroxy propyl cellulose.

* * * * *